United States Patent
Soni et al.

(10) Patent No.: US 11,335,329 B2
(45) Date of Patent: May 17, 2022

(54) METHOD AND SYSTEM FOR GENERATING SYNTHETIC MULTI-CONDITIONED DATA SETS FOR ROBUST AUTOMATIC SPEECH RECOGNITION

(71) Applicant: Tata Consultancy Services Limited, Mumbai (IN)

(72) Inventors: Meetkumar Hemakshu Soni, Thane (IN); Sonal Joshi, Thane (IN); Ashish Panda, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 247 days.

(21) Appl. No.: 16/827,863

(22) Filed: Mar. 24, 2020

(65) Prior Publication Data

US 2021/0065681 A1    Mar. 4, 2021

(30) Foreign Application Priority Data

Aug. 28, 2019   (IN) .............................. 201921034591

(51) Int. Cl.
*G10L 15/06* (2013.01)
*G10L 15/04* (2013.01)
(Continued)

(52) U.S. Cl.
CPC .......... *G10L 15/063* (2013.01); *G06K 9/6228* (2013.01); *G06K 9/6289* (2013.01);
(Continued)

(58) Field of Classification Search
None
See application file for complete search history.

(56) References Cited

U.S. PATENT DOCUMENTS

| 6,389,393 B1* | 5/2002 | Gong | G10L 15/065 |
| | | | 704/244 |
| 6,691,091 B1* | 2/2004 | Cerisara | G10L 15/063 |
| | | | 704/244 |

(Continued)

OTHER PUBLICATIONS

Yin, S. et al., "Noisy training for deep neural networks in speech recognition", EURASIP Journal on Audio, Speech, and Music Processing, Jan. 20, 2015, 14 pages Springer Nature Switzerland AG.

(Continued)

*Primary Examiner* — Douglas Godbold
(74) *Attorney, Agent, or Firm* — Finnegan, Henderson, Farabow, Garrett & Dunner, LLP (57) ABSTRACT

Performance of Automatic Speech Recognition (ASR) for robustness against real world noises and channel distortions is critical. Embodiments herein provide method and system for generating synthetic multi-conditioned data sets for additive noise and channel distortion for training multi-conditioned acoustic models for robust ASR. The method provides a generative noise model generating plurality of types of noise signals for additive noise based on weighted linear combination of plurality of noise basis signals and channel distortion based on estimated channel responses. The generative noise model is a parametric model, wherein basis function selection, number of basis functions to be combined linearly and weightages to be applied to the combinations is tunable, thereby enabling generation of wide variety of noise signals. Further, the noise signals are added to set of training speech utterances under set of constraints providing the multi-conditioned data sets, imitating real world effects.

11 Claims, 4 Drawing Sheets

(51) Int. Cl.
*G10L 21/0208* (2013.01)
*G06K 9/62* (2022.01)
*G06N 20/00* (2019.01)

(52) U.S. Cl.
CPC .............. *G06N 20/00* (2019.01); *G10L 15/04* (2013.01); *G10L 21/0208* (2013.01); *G10L 2015/0635* (2013.01)

(56) References Cited

U.S. PATENT DOCUMENTS

| | | | | |
|---|---|---|---|---|
| 2006/0136178 | A1* | 6/2006 | Kim | G10L 15/065 702/191 |
| 2008/0215322 | A1* | 9/2008 | Fischer | G10L 15/065 704/243 |
| 2008/0300875 | A1* | 12/2008 | Yao | G10L 15/142 704/236 |
| 2010/0076757 | A1* | 3/2010 | Li | G10L 15/20 704/233 |
| 2014/0337026 | A1* | 11/2014 | Ichikawa | G10L 15/063 704/243 |
| 2021/0043186 | A1* | 2/2021 | Nagano | G10L 13/033 |

OTHER PUBLICATIONS

Une M. et al.. "Generative approach using the noise generation models for DNN-based speech synthesis trained from noisy speech", 2018 Asia-Pacific Signal and Information Processing Association Annual Summit and Conference (APSIPA ASC), IEEE, Nov. 25, 2018, pp. 340-344.

Morales N. et al., "Adding noise to improve noise robustness in speech recognition", INTERSPEECH 2007: 8th Annual Conference of the International Speech Communication Association, ISCA, Aug. 27, 2007, pp. 930-933.

* cited by examiner

METHOD AND SYSTEM FOR GENERATING SYNTHETIC MULTI-CONDITIONED DATA SETS FOR ROBUST AUTOMATIC SPEECH RECOGNITION

PRIORITY CLAIM

The present application claims priority from Indian patent application no. 201921034591, filed on Aug. 28, 2019. The entire contents of the aforementioned application are incorporated herein by reference.

TECHNICAL FIELD

The embodiments herein generally relate to the field of Automatic Speech Recognition (ASR) and, more particularly, to generating synthetic multi-conditioned data sets for robust Automatic Speech Recognition (ASR).

BACKGROUND

Automatic speech recognition (ASR) is one of the most important input interface methods in field of Human Computer Interface (HCI) as speech is most natural way of communication. In practical real world applications speech signals to be processed and recognized by machines are bound to be corrupted with noise signals. Thus, an ASR system should be robust to the full range of real-world noise and other acoustic distorting conditions. Modern ASR systems still perform poorly in various degradation conditions such as channel distortion, presence of additive noise, reverberation and the like. Such performance degradation limits deployment of ASR systems in real world environments. Different approaches have been studied to improve the robustness of ASR systems.

Multi-conditioned training, which involves training an acoustic model using degraded speech data, is a widely used approach when robustness of ASR systems is expected against additive noise, channel mismatch, reverberation and the like. In multi-conditioned training approaches adding noise to training data is a form of regularization during training, which provides better generalization capabilities. The multi-conditioned training has been shown to provide better performance in the case of unseen degradation conditions than other approaches, such as enhancement front-ends. However, studies show that even with multi-conditioned approaches the performance in unseen conditions lags behind the performance obtained in seen conditions. Further, it has been observed that the performance in the unseen condition is dependent on the types of noises used in the training phase. Hence, multi-conditioning with one set of degradation conditions or noise types does not guarantee a good performance in all test conditions, where noise is unknown. Thus, it is critical to understand on kind of or type of degradation conditions that should be considered while designing the multi-conditioned training dataset to yield good performance in unseen conditions. Generally, existing methods address this issue by using a large number of noise signals to create multi-conditioned database to obtain robustness against additive noise. Similarly, a large number of room impulse responses have been used during training, to obtain robustness against reverberation. It is critical to note that however large may be the number of noise signals used during training, there exists high possibility that type of noise signals in these samples may be repeated, effectively reducing the strength of training dataset to achieve robustness of ASR in unseen noise conditions. Further, even with an effort to select each noise sample to be distinct, capturing all unknown noises is a challenge. Above mentioned limitations in the art affect the maximum robustness that can be achieved by current ASR systems.

SUMMARY

Embodiments of the present disclosure present technological improvements as solutions to one or more of the above-mentioned technical problems recognized by the inventors in conventional systems. For example, in one embodiment, a method for generating synthetic multi-conditioned data sets for robust Automatic Speech Recognition (ASR) is provided. The method comprises building a generative noise model to generate a first set of noise signals modelling distortions to a clean speech due to additive noise and a second set of noise signals modelling channel distortions to the clean speech, wherein a weighted linear combination of a plurality of noise basis signals spanning entire noise space is used to generate the first set of noise signals modelling the additive noise. Each noise signal among the first set of noise signals is unique, and wherein estimated channel magnitude responses for a plurality of communication channels are used for generating the second set of noise signals modelling the channel distortion.

The method further comprises generating a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain. The method further comprises a second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain. Furthermore, the method comprises training a Multi-Conditioned Acoustic Model for robust Automatic Speech Recognition (ASR) utilizing at least one of the first synthetic multi-conditioned dataset and the second synthetic multi-conditioned dataset.

In another aspect, a system for generating synthetic multi-conditioned data sets for robust Automatic Speech Recognition (ASR) is provided. The system comprises a memory storing instructions; one or more Input/Output (I/O) interfaces; and one or more hardware processors coupled to the memory via the one or more I/O interfaces, wherein the one or more hardware processors are configured by the instructions to build a generative noise model to generate a first set of noise signals modelling distortions to a clean speech due to additive noise and a second set of noise signals modelling channel distortions to the clean speech, wherein a weighted linear combination of a plurality of noise basis signals spanning entire noise space is used to generate the first set of noise signals modelling the additive noise. Each noise signal among the first set of noise signals is unique, and wherein estimated channel magnitude responses for a plurality of communication channels are used for generating the second set of noise signals modelling the channel distortions. The one or more hardware processors are further configured to generate a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain. The one or more hardware processors are further configured to generate second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain. Furthermore, the one or more hardware processors are configured to generate train a Multi-Conditioned Acoustic Model for robust Automatic Speech Recognition (ASR) utilizing at least one of the first synthetic multi-conditioned dataset and the second synthetic multi-conditioned dataset.

In yet another aspect, there are provided one or more non-transitory machine readable information storage mediums comprising one or more instructions, which when executed by one or more hardware processors causes a method for generating synthetic multi-conditioned data set for robust Automatic Speech Recognition (ASR). The method comprises building a generative noise model to generate a first set of noise signals modelling distortions to a clean speech due to additive noise and a second set of noise signals modelling channel distortions to the clean speech, wherein a weighted linear combination of a plurality of noise basis signals spanning entire noise space is used to generate the first set of noise signals modelling the additive noise. Each noise signal among the first set of noise signals is unique, and wherein estimated channel magnitude responses for a plurality of communication channels are used for generating the second set of noise signals modelling the channel distortions. The method further comprises generating a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain. The method further comprises a second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain. Furthermore, the method comprises training a Multi-Conditioned Acoustic Model for robust Automatic Speech Recognition (ASR) utilizing at least one of the first synthetic multi-conditioned dataset and the second synthetic multi-conditioned dataset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Synthetic noise generation for Automatic Speech Recognition (ASR) has seen very few attempts in generating training data sets covering maximum possible real world noises and channel distortions for improving performance of ASR systems or voice recognition systems. An existing work on 'Generating mixing noise signals with basis functions for simulating noisy speech and learning Deep Neural Network (DNN)-based speech enhancement models' attempts to generate synthetic noise signals with objective to denoise a noisy speech by improving Perceptual Evaluation of Speech Quality (PESQ) measure of noisy speech but does not discuss on achieving improvements in speech recognition performance. It has also been understood by a person skilled in the art that PESQ improvement does not correlate with speech recognition performance improvement. Moreover, the work limits to only four types of bases, which may not be looked upon as bases since these bases do not span or cover the entire noise space. Further, the exiting work described above does not provide insight on ensuring variability of the noise being added. Thus, hardly betters the performance for 50 known real noise types. Further, with limited number of bases used the performance of the above existing approach seems to worsen in unseen noise conditions. This is primarily due to the fact that the bases used by the existing work do not span the entire noise space.

Thus, dynamically generating noise samples providing maximum possible range of real world noises for training Automatic Speech Recognition (ASR) systems to achieve robust ASR remains a challenge.

Embodiments herein provide a method and system for generating synthetic multi-conditioned data set for additive noise and channel distortion for training multi-conditioned acoustic models for robust ASR. The method builds a generative noise model, which can dynamically generate plurality of types of noise signals for additive noise based on weighted linear combination of plurality of noise basis signals and channel distortion based on estimated channel responses. The noise basis signals are selected so as to span the entire noise space. The generative noise model disclosed herein is a parametric model, wherein noise basis signal selection, number of noise basis signals to be combined linearly and weightages to be applied to the combinations is tunable, thereby enabling generation of wide variety of noise signals. Criteria such as non-white signals or white signal weightages, linear combinations and the like are determined empirically. If experiments on validation set shows that better results can be achieved with a specific set of criteria for the specific ASR environment, the same can be selected. Further, the noise signals are added to set of training speech utterances under set of constraints providing the multi-conditioned data sets, imitating real world effects, used to train the multi-acoustic models for robust ASR.

The method provides a better alternative to existing approaches that randomly add large number of noises in the training set for unseen conditions. Further, channel simulation technique disclosed by the method further improves the performance of the system in the real time environments where channel distortion is present along with additive noise.

Figure 1:
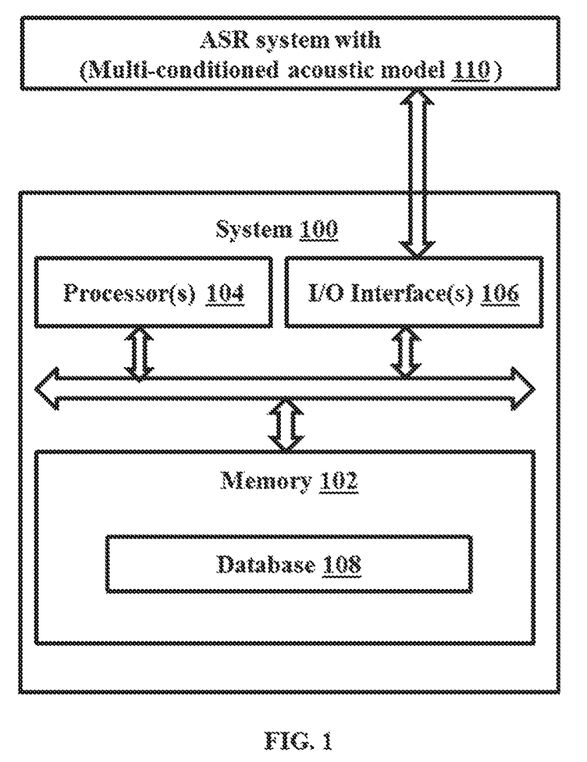
FIG. 1 is a functional block diagram of a system for generating synthetic multi-conditioned data sets for robust Automatic Speech Recognition (ASR), in accordance with some embodiments of the present disclosure.
Figure 2A:
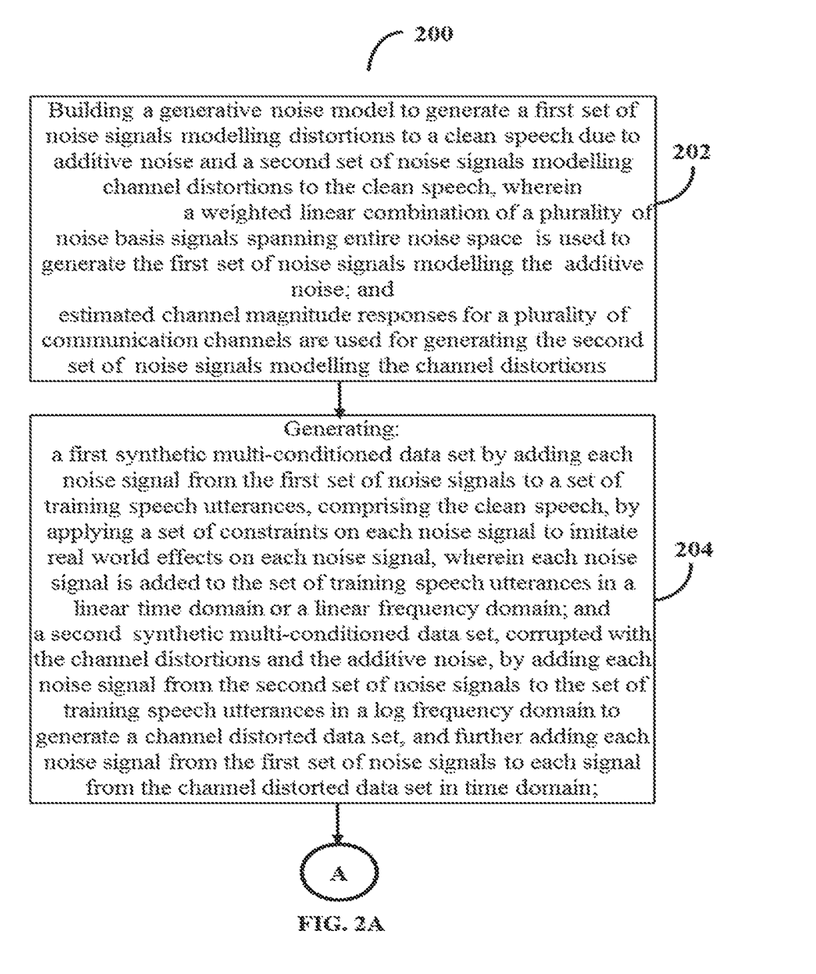
FIG. 2A and FIG. 2B is a flow diagram illustrating a method generating synthetic multi-conditioned data sets for robust ASR, using the system of FIG. 1, in accordance with some embodiments of the present disclosure.
Figure 2B:
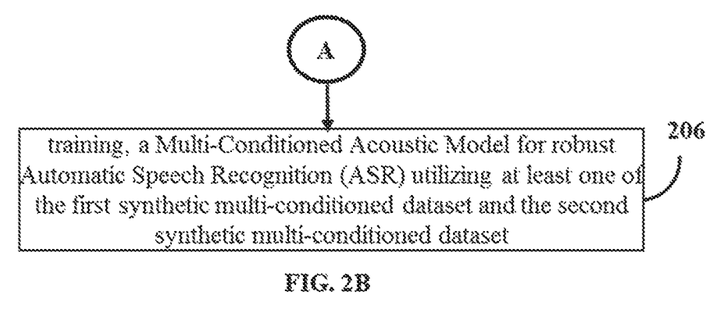
Figure 3:
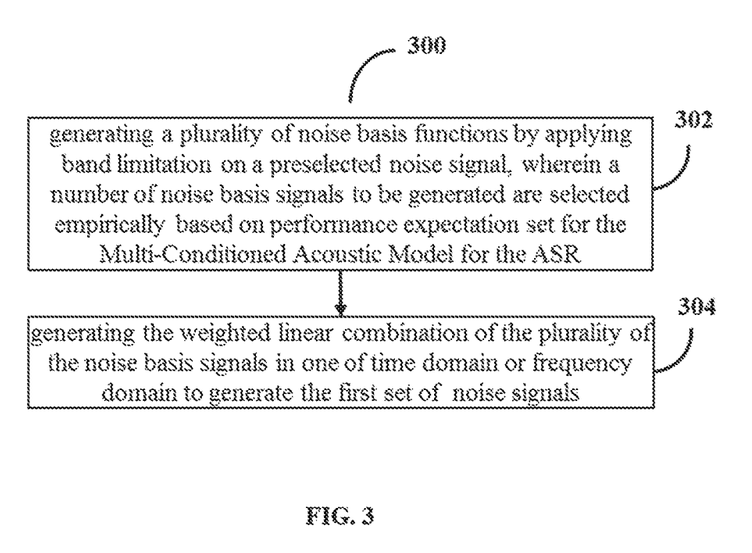
FIG. 3 illustrates a flow diagram depicting a process of the method of FIG. 2 for generating a first set of plurality of noise signals using a generative noise model of the system of FIG. 1, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram of a system 100 for generating the synthetic multi-conditioned data sets for robust Automatic Speech Recognition (ASR), in accordance with some embodiments of the present disclosure. In an embodiment, the system 100 includes a processor(s) 104, communication interface device(s), alternatively referred as or input/output (I/O) interface(s) 106, and one or more data storage devices or a memory 102 operatively coupled to the processor(s) 104. In an embodiment, the processor(s) 104, can be one or more hardware processors (104). In an embodiment, the one or more hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices to one another or to another server. The I/O interface 106 enables receiving known noise signals one or more external sources and store in a database 108 of the memory 102. Any preselected noise signal, for example a white noise, among the stored noise signals is then used by a generative noise model (not shown), which may be a module in the memory 102, to generate a first set of noise signals modelling distortions to a clean speech due to additive noise and a second set of noise signals modelling channel distortions to the clean speech. A plurality of noise basis functions are generated by the generative noise model to generate the first set of noise signals that may be stored in the memory 102. Further, channel responses for a plurality of communication channels are also estimated by the processor (5) 104 and may be stored in the memory 102. Further, a first synthetic multi-conditioned data set comprising clean speech corrupted with the additive noise and a second multi-conditioned data set comprising the clean speech corrupted with the channel distortion along with additive noise are stored in the database 108, The multi-conditioned data sets are used for training a multi-conditioned acoustic model 110 of an ASR system.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure. Further, the I/O interface 106 enables sharing the synthetic multi-conditioned data sets with the ASR system for training the multi-conditioned acoustic model 110. Functions of the components of system 100 are explained in conjunction with method steps of flow diagram depicted in FIGS. 2A, 2B and 3.

FIG. 2A and FIG. 2B is a flow diagram illustrating a method 200 for generating the synthetic multi-conditioned data sets for robust ASR, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) 104. The steps of the method 200 of the present disclosure will now be explained with reference to the components or blocks of the system 100 as depicted in FIG. 1 and the steps of flow diagram as depicted in FIG. 2 and FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the processor(s) 104 is configured to build the generative noise model to generate the first set of noise signals modelling distortions to a clean speech due to additive noise and the second set of noise signals modelling channel distortions to the clean speech. Examples of additive noise include background noises captured along with the clean speech while recording the input speech signals. Similarly, distortion introduced into a clean speech signal due to frequency responses of microphones used to record the speech is one example of channel distortion, wherein the two different microphones represent two different communication channels. Since each type of microphone may have a different frequency response, channel distortion introduced in the clean speech due to each type of microphone used will be different.

The generative model utilizes a weighted linear combination of a plurality of noise basis signals to generate the first set of noise signals modelling the additive noise. The noise basis functions are so selected to span the entire noise space and each noise signal among the first set of noise signals so generated, is unique. Further, the generative model utilizes estimated channel magnitude responses for a plurality of communication channels for generating the second set of noise signals modelling the channel distortions.

Thus, the weighted linear combinations of one or more of these noise signals enables generation of maximum possible variety of synthetic noise signals to imitate maximum possible known and unknown noises, alternatively referred as seen and unseen degradation conditions. The generation of the plurality of basis signals and the first set of noise signals from these noise basis signals is explained in conjunction with a process 300 depicted in FIG. 3 and used by step 202 of the method 200.

At step 302 of the process 300, the processor(s) 104, is configured to generate the plurality of noise basis signals by applying band limitation on a preselected noise signal. In an example, the preselected noise signals can be one of known noise signals such as a white noise, any non-white signal, environmental noise or the like. A number of noise basis signals to be generated are selected empirically based on performance expectation set for the Multi-Conditioned Acoustic Model 110 for the ASR. If experiments on validation set shows that better results can be had with a specific signal for the real time environment, where the ASR system is to be deployed then that specific signal is selected.

Further, at step 304, the processor(s) 104 is configured to dynamically generate the weighted linear combination of the plurality of the noise basis signals in one of time domain or frequency domain to generate the plurality of types of noise signals. The mathematical analysis of step 302 and step 304 is explained below.

Generative noise model: In the state-of-the-art ASR systems, the feature representation of speech signal, such as Mel Frequency Cepstral Coefficients (MFCCs) or log-Mel Filter bank Energies (MFBEs) are used for acoustic modelling. Hence, the final decision regarding the spoken word is taken using the feature domain representation. In an embodiment, for one implementation mechanism, the system 100 utilizes feature representation of the speech signal to build the generative noise model. The generative noise model determines the noise basis signals and accordingly generates the types of noise signals. Thus, in one implementation, at step 302, the MFBEs are used to build the generative noise model, alternatively referred as generative model. The MFBEs are computed by filtering the magnitude of Short-time Fourier Transform (STFT) using an overlapping Triangular Filter Bank (TFB). Filters of the TFB have linearly spaced center frequencies and equal bandwidth on Mel scale. Further, the magnitude of the TFB filters are decomposed in two parts to formulate the generative noise model. A $b^{th}$ filter in TFB can be decomposed in left and right part where left part covers first half of the bandwidth in Mel scale and the right part covers the second half. Mathematically, these responses can be written as:

$$TFB_b^L(f) = \begin{cases} 0, & \text{if } f < F_b^L \text{ and } f > F_b^C \\ \frac{f - F_b^L}{F_b^C - F_b^L}, & \text{if } F_b^L \le f \le F_b^C \end{cases} \quad (1)$$

$$TFB_b^R(f) = \begin{cases} \frac{F_b^H - f}{F_b^H - F_b^C}, & \text{if } F_b^C < f \le F_b^H \\ 0, & \text{if } f \le F_b^C < f > F_b^H \end{cases} \quad (2)$$

Where, $TFB_b^L(f)$ and $TFB_b^R(f)$ are the frequency responses of left half and the right half of the $b^{th}$ filter in TFB. $F_b^L$, $F_b^C$, $F_b^H$ are lower frequency, center frequency, and higher frequency of $b^{th}$ filter in TFB respectively.

Now consider a band-limited STFT magnitude of a signal $n_b(t)$ defined as:

$$N_b(t, f) \begin{cases} = 0, \text{ if } f < F_b^L \text{ and if } > F_b^C \\ > 0, \text{ if } F_b^L \le f \le F_b^C \end{cases} \quad (3)$$

Where, $N_b(t, f)$ is the STFT magnitude of a signal $n_b(t)$. Eq. 3 suggests that $N_b(t, f)$ is the band-limited with the lower frequency $F_b^L$, higher frequency $F_b^C$. Here, $F_b^L$ and $F_b^C$ are the lower frequency and center frequency of the $b^{th}$ filter bank in TFB. The signal $n_b(t)$ is strictly band-limited between $F_b^L$ and $F_b^C$. If there are such signals for each band b in TFB, then energy in each filter of TFB can we written as:

$$FBE(t,b) = \alpha_b^L(t)\Sigma_f N_b(t,f) \times TFB_b^L(f) + \alpha_b^R(t)\Sigma_f N_{b+1}(t,f) \times TFB_b^R(f) \quad (4)$$

Where, $FBE(t, b)$ is the energy of $b^{th}$ filter bank for $t^{th}$ frame of the signal, and $\alpha_b^L(t)$ and $\alpha_b^R(t)$ are coefficients corresponding to left and right part of the filter magnitude response of the $b^{th}$ filter in TFB and frame t. Here, the values of $\alpha_b^L(t)$ and $\alpha_b^R(t)$ are chosen such that $FBE(t, b) \ge 0$. If it is considered that the property of overlapping TFB used for computing FBE, where $F_b^C = F_{b+1}^L$ and $F_b^H = F_{b+1}^C$, then it can be said that Eq. 4 spans the entire space of FBEs. The energy in each band can be written as the linear combination of different $N_b(t, f)$s and its dot product with the TFB filter responses. Here each $n_b(t)$ is band-limited with non-overlapping bands. Hence, by varying the values of parameters such as $\alpha_b^L(t)$ and $\alpha_b^R(t)$ for different $N_b(t, f)$s, the FBEs of any signal can be generated. This generative noise model, thus provides a tunable parametric model, which can be then used to sample FBEs of any signal and use it as the additive noise source.

Sampling noises from the generative noise model: Now, described below is the manner in which noises are sampled using the generative model described in Eq. 4. For the same, time-domain signals $n_b(t)$ that has the magnitude response as per Eq. 3 is designed. As per Eq. 3, $n_b(t)$ has to be band-limited according to lower and center frequencies of $b^{th}$ filter in the TFB. Theoretically, any band-limited signal can be used. In an embodiment, band-passed white noise signals are used as $n_b(t)$s. A white noise frame is taken and Discrete Fourier Transform (DFT) is multiplied with a rectangular window with the frequencies in the range as per in Eq. 3. Used herein is an overlap-add method to convert frames into a continuous time-domain signal. Thus, total B+1 such band-limited signals are generated, where B is the total number of bands in the TFB. These signals $n_b(t)$ have the required magnitude response $N_b(t, f)$. After getting $N_b(t, f)$ for different bands, they can be added in time domain with different values of a in Eq. 4.

Referring back to step 204 of the method 200, at step 204 the processor(s) 104 is configured to generate the first synthetic multi-conditioned data set and the second synthetic multi-conditioned data set. The first synthetic multi-conditioned data set is generated by adding each noise signal from the first set of noise signals to a set of training speech utterances, comprising the clean speech. Further, during addition a set of constraints are applied on each noise signal to imitate real world effects on each noise signal. The addition of each noise signal is added to the set of training speech utterances in carried out in a linear time domain or a linear frequency domain. The set of constraints include restricting a number of speech segments (N) from a speech utterance among the set of training speech utterances to which a noise signal among the plurality of types of noise signals is added; and restricting a number of frequency bands (M) of the set of training speech utterances to which the noise type can be added. Mathematical analysis for the set of constraints related to M and N applied to the noise signals is explained below.

The second synthetic multi-conditioned data set represents clean speech signals corrupted with the channel distortions and the additive noise. The second synthetic multi-conditioned data set generation happens in two steps. Firstly adding each noise signal from the second set of noise signals to the set of training speech utterances in a log frequency domain to generate a channel distorted data set. Thereafter, each noise signal from the first set of noise signals is added to each signal from the channel distorted data set in time domain.

Set of constraints: While adding the signals in time-domain in equation 4 above, the constraint $\alpha_b^R(t)=\alpha_{b+1}^L(t)$ since one $n_b(t)$ is responsible for FBEs in two filters, and cannot be added with two magnitudes in the time domain. Here, while adding noises in the time domain, considered is one $\alpha_b(t)$ per time frame t for each $n_b(t)$. With this constraint, the Eq. 4 no longer spans the entire FBE space, however still significant number of noise types can be generated. Moreover, putting constraints on $\alpha_b(t)$ in time-domain also is considered. Thus, $\alpha_b(t)$ is constrained to not vary in the time-domain for a defined number of consecutive frames K, i.e., $\alpha(t)=\alpha(t+k)$ for $\in 1,2,3 \ldots K$. Here, the different values of K is chosen for different utterances. This is done to simulate the stationary behavior of some noises that do not change randomly in time domain. In addition to constraints described above, one more constraint on the values of $\alpha_b(t)$ is applied. For one frame at time t, few of the $\alpha_b(t)$ are made very small compared to other values. It is done to simulate noises that has more energy only in few sub-bands. With this constraints different noise signals with different values of $\alpha_b(t)$ can be generated. The entire noise sampling process can be parameterized using two parameters. To simulate the stationary behavior of noises, an utterance with length L is divided into N segments. And for each segment, the values of $\alpha_b(t)$ arekeptconstant. Moreover, to make some bands to have very small magnitude (order of $10^{-3}$), maximum of M bands per segment are selected randomly. Values of $\alpha_b(t)$ for these bands are sampled uniformly from 0.1 to 1. For other B-M bands, the values are sampled from 0 to $10^{-3}$. With different value of N for each utterance, and different value of M for each segment, different types of noise can be generated using the proposed model. Thus, these noises with constraints when added to clean utterances provide the first synthetic multi-conditioned dataset, which is used to train the multi-conditioned acoustic model 110 against additive noise to build robust ASR systems. The optimal values of M and N are determined empirically on the development data.

Channel simulation for channel distortion: Channel distortions are convoluted in nature. Hence, the signals are processed in log STFT magnitude domain where they have additive effect. To simulate the channel effect, multiply the magnitude of clean speech STFT by an estimate of the channel magnitude response by adding them in log domain. The channel simulation technique that considers channel distortion shifts the mean of log STFT magnitude of clean signal to that of an unknown utterance with channel distortion. The channel simulation scheme can be describes as follows:

$$Y(t,f)=X(t,f)+\hat{C}(t,f) \quad (5)$$

Where t is the frame index, f is the frequency index, X(t, f) is the log STFT magnitude of clean signal, $\hat{C}$(t, f) is the log STFT magnitude of an estimated channel distortion, and Y(t, f) is the log STFT magnitude of channel simulated signal. $\hat{C}$(t, f) is estimated using following formula:

$$\hat{C}(t,f) = \frac{1}{T}\sum_{t=0}^{T-1}\hat{Y}(t,f) - \frac{1}{T}\sum_{t=0}^{T-1}\hat{X}(t,f) \quad (6)$$

Where, T is the total number of frames, $\hat{Y}$(t, f) is the log magnitude of channel distorted signal, $\hat{X}$(t, f) is the log magnitude of corresponding clean signal. The signal is converted in time domain using inverse STFT with the phase of the clean signal. Individual frames are converted in a continuous time-domain signal with overlap-add method. This channel simulation performed provides the second synthetic multi-conditioned dataset, simulating channel distortion or channel degradation on clean utterances.

Referring back to steps of method 200, at step 206, the processor(s) 104 is configured train the Multi-Conditioned Acoustic Model 110 for robust Automatic Speech Recognition (ASR) utilizing one of the first synthetic multi-conditioned dataset for additive noise and the second synthetic multi-conditioned dataset for channel distortion along with additive noise.

Experimental Results

Database description: All the experiments were performed on known Aurora-4 database. Aurora-4 is a medium vocabulary database used for noise robust continuous speech recognition task. It contains speech data in the presence of additive noises and linear convolutional (channel) distortions. It contains two training sets. One is clean training set consisting of 7138 utterances recorded by the primary Sennheiser® microphone. The other one is time-synchronized multi-conditioned training set. One half of the utterances were recorded by the primary Sennheiser® microphone while the other half were recorded using one of the secondary microphones. Both halves include a combination of clean speech (893 utterances) and speech corrupted by one of six different noises (street, train station, car, babble, restaurant and airport) at 10-20 dB SNR (2676 utterances). Two test sets consists of 330 utterances from 8 speakers, which was recorded by the primary microphone and a set of secondary microphones, respectively. Each set was then corrupted by the same six noises used in the training set at 5-15 dB SNR, creating a total of 14 test sets. These 14 test sets were grouped into 4 subsets: clean (Set 1, denoted by A), noisy (Set 2 to Set 7, denoted by B), clean with channel distortion (Set 8, denoted by C), noisy with channel distortion (Set 9 to Set 14, denoted by D). Moreover, 100 utterances are chosen from validation set available with Aurora 4 for tuning the parameters associated with proposed generative model. These utterances were similarly recorded and corrupted by conditions used in test set. Hence, giving 1400 total validation utterances. Two sets of experiments are performed. In the first set, multi-conditioned data is used by only adding additive noises, referred as to first synthetic multi-conditioned data set. To compare the performance of different noise types, different training sets were created by adding different types of noise in the clean utterances of Aurora 4. The noises designed were added using the disclosed generative model to generate multi-conditioned dataset (first multi conditioned dataset). The noises were generated with the different values of number of segment per utterance (5, 10, 15, and 20) and maximum bands per segment (5, 10, 15, 20, and 24). The noise signals from the generative model were added with the SNR of 0-15 dB with 5 dB of increment, following. Also derived were two additional multi-conditioned training set by adding 100 types of environmental noises, and 11 types of noises from Noisex noise database following the same SNR scheme. The babel noise was removed from Noisex since it is present in the test set and the goal is to test the system performance in unseen noise conditions. The clean utterances recorded by both set of microphones available with Aurora-4 multi-conditioned data are retained. The resulting training set had 893 clean utterances recorded using primary microphone, 893 clean utterances recorded using secondary microphones, and 5352 utterances with additive noise recorded using primary microphone. In second set of experiments, consider channel distortion plus additive noise distortions (second synthetic multi-conditioned dataset). Aurora-4 dataset does not provide clean utterances recorded using secondary microphones corresponding to the utterances corrupted with channel plus additive noise. Hence, to simulate channel degradations, first applied is the disclosed channel distortion technique and then are added the noise signals. To estimate the channel distortions, 893 clean utterances recorded by secondary microphones and their counterparts recorded using primary microphone are used. Eq. 6 is used to estimate channel responses corresponding to 893 utterances. It can be noted that all the channel responses are computed from the training set only. Then randomly a channel response is selected and apply it using Eq. 5 to clean utterances. Then aforementioned noises are added to channel distorted signals. 2676 utterances corrupted by channel and additive noise using this method are generated. The performance of all these ASR systems on the test set of Aurora 4 is evaluated. All the noises and channel distortions in test dataset can be considered unseen noise conditions.

ASR system description and training: In an example ASR system the multi-conditioned acoustic model 110 is DNN-Hidden Markov Models (HMM) acoustic model. First a Gaussian Mixture Models (GMM)-HMM system using 13 dimensional MFCCs features in Kaldi using the WSJ recipe is developed. The GMM-HMM system is trained on clean data. Then the alignments of clean data is used to develop DNN-HMM system on multi-conditioned data. DNNs are implemented in Tensorflow. The DNN had 7 hidden layers with 2048 hidden units and ReLU activation. The input layer had 11-frame context of 24 dimensional log-MFBEs with their delta and delta-delta features. Hence, the input layer has (11×72=792) units. The output layer has 3088 softmax units, corresponding to 3088 tied states of HMMs. Input features were normalized to have zero mean and unit variance. Moreover, the utterance-level mean normalization was also used. The network was trained with random initialization for 30 epochs. The batch size of 256 was and the learning rate was scheduled to decrease linearly as per training epochs. For first 20 epochs, the learning rate was decreased from initial 0.001 to final 0.0001. The final learning rate of 0.0001 was kept constant for remaining epochs. The network was trained using Stochastic Gradient Descent (SGD) with Adam optimizer.

Results: The ASR system with the multi acoustic model 110 trained on the Aurora 4 multi-conditioned data gives 11.48% Word Error Rate (WER) on the test set. This result represents the performance of multi-conditioned data in seen conditions. It is better than the ones reported in earlier works, for the same feature-set and network architecture, which shows that the training scheme employed in this method disclosed works well. Table 1 shows the performance of ASR systems trained using noises generated from the generative noise model with different number of segments per utterance (N) and number of maximum bands per segment (M) on development set. The results show that the performance of ASR system changes with the change in the above two parameters. By changing the number of segments per utterance, the possible number of different noise conditions can be controlled. With more number of segments per utterance, the number of noise conditions in the database can be increased. And by changing the number of maximum bands per segment the frequency regions in which noise is added is controlled. Table 2 shows the results with channel simulations introduced using the method proposed in Section 3. Although experiments were conducted with M>20 and N>20 (not shown for brevity), they follow the trend reported in here. In both cases, the best performance is obtained with M=10 and N=5. Moreover, the channel simulation technique improved the performance on test set D, as expected.

Table 1 below depicts WER (%) on validation set using noises generated from the generative noise model with different number of segments (N) and maximum bands per segment (M) without any channel distortions.

TABLE 1

| N | M | A | B | C | D | Avg |
|---|---|---|---|---|---|---|
| 5 | 5 | 17.17 | 24.03 | 19.92 | 27.44 | 24.71 |
| 10 | 5 | 16.73 | 24.73 | 19.74 | 28.17 | 25.28 |
| 15 | 5 | 16.98 | 24.79 | 19.42 | 28.2 | 25.31 |
| 20 | 5 | 16.17 | 24.9 | 19.11 | 28.83 | 25.58 |
| 5 | 10 | 18.11 | 24.01 | 19.86 | 27.31 | 24.7 |
| 10 | 10 | 17.48 | 24.98 | 20.11 | 27.64 | 25.24 |
| 15 | 10 | 17.23 | 24.64 | 19.86 | 28.05 | 25.23 |
| 20 | 10 | 16.6 | 25.1 | 18.89 | 28.21 | 25.39 |
| 5 | 15 | 17.48 | 24.91 | 19.24 | 27.15 | 24.93 |
| 10 | 15 | 17.54 | 25.3 | 19.55 | 28.21 | 25.58 |
| 15 | 15 | 16.48 | 25.28 | 18.98 | 27.84 | 25.3 |
| 20 | 15 | 17.17 | 25.03 | 20.24 | 27.84 | 25.33 |
| 5 | 20 | 17.23 | 25.25 | 19.42 | 27.87 | 25.38 |
| 10 | 20 | 17.29 | 25.08 | 20.05 | 28 | 25.42 |
| 15 | 20 | 16.85 | 25.64 | 19.17 | 28.19 | 25.64 |
| 15 | 20 | 16.85 | 25.64 | 19.17 | 28.19 | 25.64 |

Table 2 depicts WER (%) on validation set using additive noises generated from the generative noise model and channel distortions simulated using the method disclosed.

TABLE 2

| N | M | A | B | C | D | Avg |
|---|---|---|---|---|---|---|
| 5 | 5 | 17.42 | 24.99 | 19.49 | 27.78 | 25.25 |
| 10 | 5 | 16.6 | 24.51 | 18.36 | 27.61 | 24.83 |
| 15 | 5 | 17.42 | 24.66 | 19.99 | 28.45 | 25.43 |
| 20 | 5 | 16.79 | 24.68 | 19.11 | 28.28 | 25.26 |
| 5 | 10 | 17.61 | 23.93 | 19.36 | 26.58 | 24.29 |
| 10 | 10 | 17.17 | 24.52 | 19.11 | 27.58 | 24.92 |
| 15 | 10 | 16.98 | 24.39 | 19.74 | 28.29 | 25.2 |
| 20 | 10 | 17.36 | 24.91 | 19.36 | 27.58 | 25.12 |

TABLE 2-continued

| N | M | A | B | C | D | Avg |
|---|---|---|---|---|---|---|
| 5 | 15 | 17.04 | 24.49 | 19.61 | 27.22 | 24.78 |
| 10 | 15 | 17.36 | 24.5 | 19.17 | 27.21 | 24.77 |
| 15 | 15 | 17.11 | 25.1 | 19.99 | 27.77 | 25.31 |
| 20 | 15 | 17.42 | 25.39 | 19.36 | 28.14 | 25.57 |
| 5 | 20 | 17.67 | 25.06 | 19.99 | 27.84 | 25.36 |
| 10 | 20 | 17.36 | 25.07 | 19.8 | 27.94 | 25.38 |
| 15 | 20 | 16.6 | 25.45 | 19.11 | 27.87 | 25.4 |
| 20 | 20 | 17.61 | 25.48 | 19.67 | 28.1 | 25.63 |

Table 3 shows the results for ASR systems trained using various multi-conditioned training methods on Aurora-4 test set. The results are shown for multi-conditioned data generated by generative model, 100 types of environmental noises and noises from Noisex database. The results are shown for systems trained with and without channel simulation. The results of the method disclosed are shown for M=10 and N=5. In the case of only additive noises without channel distortions, the ASR system trained environmental noises gives 15.38% WER. The ASR system trained on Noisex database gives 15.34% WER. While the ASR system (the multi-conditioned acoustic model 110 of the ASR) trained on only white noise (not shown in the table) gave 20.64% WER. The generative model disclosed gives 14.80% WER, which is an improvement over both. This result is all the more remarkable, since it was achieved with only 24 band limited white noise signals. Introducing the channel simulations further improved the performance of all the systems by a substantial margin. The environmental noises provide 14:88% WER, while Noisex provides 14:66% WER. The noises from the generative model outperform both with 14% WER. The substantial improvement in test set D can be observed due to the channel simulation technique. This shows the effectiveness of the generative noise model and the channel simulation technique in unseen conditions. Table 3 depicts WER (%) on Aurora-4 test set in unseen conditions. Results are shown for multi-conditioning using noises generated by the generative model, 100 environmental noises and Noisex noises. Results with channel simulation are denoted by (condition+C).

TABLE 3

| Noise source | A | B | C | D | Avg |
|---|---|---|---|---|---|
| Generative noise model | 4.58 | 9.7 | 11.48 | 23.38 | 14.80 |
| Environment | 4.02 | 8.79 | 9.76 | 25.4 | 15.38 |
| Noisex | 4.08 | 10.19 | 9.98 | 24.29 | 15.34 |
| Generative noise model + C | 4.51 | 9.37 | 10.81 | 21.62 | 14.00 |
| Environment + C | 4.25 | 9.26 | 10.57 | 24.2 | 14.88 |
| Noisex + C | 4.43 | 10.12 | 10.29 | 23.1 | 14.66 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for generating synthetic multi-conditioned datasets for robust Automatic Speech Recognition (ASR), the method comprising:
    building, by one or more hardware processors, a generative noise model to generate a first set of noise signals modelling distortions to a clean speech due to additive noise and a second set of noise signals modelling channel distortions to the clean speech, wherein
        a weighted linear combination of a plurality of noise basis signals spanning an entire noise space is used to generate the first set of noise signals modelling the additive noise, wherein each noise signal among the first set of noise signals is unique; and
        estimated channel magnitude responses for a plurality of communication channels are used for generating the second set of noise signals modelling the channel distortions;
    generating, by the one or more hardware processors:
        a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain; and
        a second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain; and
    training, by the one or more hardware processors, a Multi-Conditioned Acoustic Model for robust Automatic Speech Recognition (ASR) utilizing at least one of the first synthetic multi-conditioned dataset and the second synthetic multi-conditioned dataset.

2. The method of claim 1, wherein generating the first set of noise signals comprises:
    generating the plurality of noise basis signals by applying band limitation on a preselected noise signal, wherein a number of noise basis signals to be generated are selected empirically based on performance expectation set for the Multi-Conditioned Acoustic Model for the ASR; and
    generating the weighted linear combination of the plurality of the noise basis signals in one of time domain or frequency domain to generate the first set of noise signals.

3. The method of claim 2, wherein the preselected noise signal is one of a white noise and a non-white noise, selected empirically based on the performance expectation set for the Multi-Conditioned Acoustic Model for the ASR.

4. The method of claim 2, wherein the number of noise basis signals is equal to a number of Mel-filters used to compute speech features in the ASR.

5. The method of claim 1, wherein the set of constraints on each noise signal from the first set of noise signals are applied in one of a time domain or a frequency domain to imitate real world effects on each noise signal, wherein the set of constraints comprise:
    restricting a number of speech segments (N) from a speech utterance among the set of training speech utterances to which a noise signal among the first set of noise signals is added; and
    restricting a number of frequency bands (M) of the set of training speech utterances to which the noise type can be added.

6. A system for generating synthetic multi-conditioned datasets for robust Automatic Speech Recognition (ASR), the system (100) comprising:
    a memory storing instructions;
    one or more Input/Output (I/O) interfaces; and
    one or more hardware processors coupled to the memory via the one or more I/O interfaces, wherein the one or more hardware processors are configured by the instructions to:
        build a generative noise model to generate a first set of noise signals modelling distortions to a clean speech due to additive noise and a second set of noise signals modelling channel distortions to the clean speech, wherein
            a weighted linear combination of a plurality of noise basis signals spanning an entire noise space is used to generate the first set of noise signals modelling the additive noise, wherein each noise signal among the first set of noise signals is unique; and
            estimated channel magnitude responses for a plurality of communication channels are used for generating the second set of noise signals modelling the channel distortions;
        generate:
            a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain; and
            a second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain; and
        train a Multi-Conditioned Acoustic Model 110 for robust Automatic Speech Recognition (ASR) utilizing at least one of the first synthetic multi-conditioned dataset and the second synthetic multi-conditioned dataset.

7. The system of claim 6 wherein, the one or more hardware processors are configured to generate the first set of noise signals by:
    generating the plurality of noise basis signals by applying band limitation on a preselected noise signal, wherein a number of noise basis signals to be generated are selected empirically based on performance expectation set for the Multi-Conditioned Acoustic Model for the ASR; and generating the weighted linear combination of the plurality of the noise basis signals in one of a time domain or a frequency domain to generate the first set of noise signals.

8. The system of claim 7, the preselected noise signal is one of a white noise and a non-white noise, selected empirically based on the performance expectation set for the Multi-Conditioned Acoustic Model for the ASR.

9. The system of claim 7, wherein the number of noise basis signals is equal to a number of Mel-filters used to compute speech features in the ASR.

10. The system of claim 6, wherein the one or more hardware processors are configured to apply the set of constraints on each noise signal from the first set of noise signals in one of time domain or frequency domain to imitate real world effects on each noise signal, wherein the set of constraints comprise:
  restricting a number of speech segments (N) from a speech utterance among the set of training speech utterances to which a noise signal among the first set of noise signals is added; and
  restricting a number of frequency bands (M) of the set of training speech utterances to which the noise type can be added.

11. One or more non-transitory machine readable information storage mediums comprising one or more instructions, which when executed by one or more hardware processors causes:
  building, by one or more hardware processors, a generative noise model to generate a first set of noise signals modelling distortions to a clean speech due to additive noise and a second set of noise signals modelling channel distortions to the clean speech, wherein
    a weighted linear combination of a plurality of noise basis signals spanning an entire noise space is used to generate the first set of noise signals modelling the additive noise, wherein each noise signal among the first set of noise signals is unique; and
    estimated channel magnitude responses for a plurality of communication channels are used for generating the second set of noise signals modelling the channel distortions;
  generating, by the one or more hardware processors:
  a first synthetic multi-conditioned data set by adding each noise signal from the first set of noise signals to a set of training speech utterances, comprising the clean speech, and by applying a set of constraints on each noise signal to imitate real world effects on each noise signal, wherein each noise signal is added to the set of training speech utterances in a linear time domain or a linear frequency domain; and
  a second synthetic multi-conditioned data set, corrupted with the channel distortions and the additive noise, by adding each noise signal from the second set of noise signals to the set of training speech utterances in a log frequency domain to generate a channel distorted data set, and further adding each noise signal from the first set of noise signals to each signal from the channel distorted data set in time domain; and
  training, by the one or more hardware processors, a Multi-Conditioned Acoustic Model for robust Automatic Speech Recognition (ASR) utilizing at least one of the first synthetic multi-conditioned dataset and the second synthetic multi-conditioned dataset.

* * * * *